United States Patent
Luo et al.

(10) Patent No.: US 8,362,643 B2
(45) Date of Patent: Jan. 29, 2013

(54) BATTERY-BASED GRID ENERGY STORAGE FOR BALANCING THE LOAD OF A POWER GRID

(75) Inventors: Hongbin Luo, Shenzhen (CN); Yunhao Liao, Shenzhen (CN); Zifeng Zhang, Shenzhen (CN); Yinghui Wang, Shenzhen (CN); Linwang Deng, Shenzhen (CN); Donghong Chen, Shenzhen (CN); Shaowen Yin, Shenzhen (CN); Xiaohua Tang, Shenzhen (CN)

(73) Assignee: BYD Company Ltd., Shenzhan (CN)

( * ) Notice: Subject to any disclaimer, the term of this patent is extended or adjusted under 35 U.S.C. 154(b) by 683 days.

(21) Appl. No.: 12/540,312

(22) Filed: Aug. 12, 2009

(65) Prior Publication Data
US 2010/0276998 A1    Nov. 4, 2010

(30) Foreign Application Priority Data
Apr. 30, 2009    (CN) .......................... 2009 1 0136165

(51) Int. Cl.
*H02J 1/12* (2006.01)
(52) U.S. Cl. .......................................................... 307/46
(58) Field of Classification Search ............... 307/44, 307/45, 46; 700/286, 297, 298
See application file for complete search history.

(56) References Cited

U.S. PATENT DOCUMENTS

| | | | |
|---|---|---|---|
| 7,270,911 B2 * | 9/2007 | Clarke et al. ................... | 429/105 |
| 8,022,572 B2 * | 9/2011 | Vyas et al. ....................... | 307/66 |
| 2002/0057582 A1 * | 5/2002 | Nakayama et al. ............. | 363/17 |
| 2004/0004794 A1 * | 1/2004 | Kang et al. ...................... | 361/38 |
| 2006/0062034 A1 * | 3/2006 | Mazumder et al. ............ | 363/131 |
| 2008/0088183 A1 * | 4/2008 | Eckroad et al. ................. | 307/66 |
| 2008/0290838 A1 * | 11/2008 | Llonch ........................... | 320/137 |
| 2009/0273240 A1 * | 11/2009 | Gurunathan et al. ............ | 307/64 |
| 2010/0253142 A1 * | 10/2010 | Votoupal et al. ................ | 307/31 |
| 2011/0187194 A1 * | 8/2011 | Keimling et al. ............... | 307/65 |

FOREIGN PATENT DOCUMENTS
WO    WO 2009081205 A2 *    7/2009

* cited by examiner

*Primary Examiner* — Daniel Cavallari
(74) *Attorney, Agent, or Firm* — Morgan, Lewis & Bockius LLP

(57) ABSTRACT

The present invention provides a battery-based grid energy storage for balancing the load of an power grid, wherein the energy storage comprises: a battery array; a bi-directional inverter unit; the bi-directional inverter system is configured to charge battery array using power from the power grid, or conversely, to transmit power from battery array to the power grid; a monitor system configured to detect the load, frequency and phase of the power grid, and control the bi-directional inverter system to charge battery array using power form the power grid, or conversely, transmits power from battery array to the power grid in accordance with the frequency and phase of the power grid so as to balance the load of the power grid, and meet the requirements during peak hours of electric power consumption.

10 Claims, 3 Drawing Sheets

BATTERY-BASED GRID ENERGY STORAGE FOR BALANCING THE LOAD OF A POWER GRID

CROSS-REFERENCE TO RELATED APPLICATIONS

The present application claims priority to Chinese Patent Application No. 200910136165.0 filed on Apr. 30, 2009, the entirety of which is hereby incorporated by reference.

BACKGROUND OF THE INVENTION

1. Filed of the Invention

The present invention relates to battery-based grid energy storage in a power grid, specifically, relates to battery-based grid energy storage for balancing the load of a power grid.

2. Background of the Related Art

Along with the development of the industry and agriculture as well as the improvement of life quality, the demand for electricity is increasing. Although great investment has been put by the government on thermal power energy storages and hydropower storages, it is still hard to meet the increasing demands of the electric power work load.

The work loads of the power grid vary in different periods of a day. Currently, 6-9 pm in the evening is the peak time for electric power usage. Thus, backup energy storage is needed to support the power grid so as to meet the electric power usage during the peak time. Existing backup energy storages in the power grid mainly comprise coal energy storages, oil energy storages, hydropower storages and pumped energy storages.

Among those energy storages, the energy storages using coal and oil are expensive and need long time to start or stop, and cause severe pollution to the environment. Considering the cost, safety and environment protection, the energy storages using coal or oil are not suitable for high peak time regulation. The hydropower storages have high peak regulation ability but the available resource is limited. As a major type of energy storages for high peak regulation, the usage of the pumped energy storages are limited because it requires large site area, takes long time to build and is restricted by certain geographical conditions. Therefore, novel energy storage is needed nowadays to meet the power consumption needs.

SUMMARY OF THE INVENTION

To solve the problem that no suitable energy storages yet available to regulate the peak of electric power consuming, the present invention provides a novel energy storage, which can regulate the peaks and vales of the electric power consumption, and further balance the load of a power grid.

The energy storage in the present invention is battery-based grid energy storage. The battery-based grid energy storage is used for balancing the workload of the power grid, wherein the energy storage comprises a battery array; a bidirectional inverter system, wherein the bi-directional inverter system is configured to charge battery array using the electric power from the power grid or conversely, input the electric power from the battery array to the power grid; a monitor system configured to detect the load, frequency and phase of the power grid and control the bidirectional inverter system accordingly to charge the battery array using the electric power from the power grid or conversely, and input the power form the battery array to the power grid in accordance with the frequency and phase of the power grid. Accordingly, the load in the power grid can be balanced.

The present invention provides a battery-based grid energy storage for balancing the load of the power grid, wherein the monitor system is configured to detect the load, frequency and phase of the power grid and control the bidirectional inverter system to charge battery array using the electric power form the power grid or conversely, input the power from the battery array to the power grid in accordance with the frequency and phase of the power grid to balance the load of the power grid. The battery-based grid energy storage in the present invention requires smaller site area and less cost, causes little environmental pollution, and is safe to operate.

DETAILED DESCRIPTION OF THE EMBODIMENTS

The aforementioned features and advantages of the present invention as well as the additional features and advantages thereof will be further clearly understood hereafter as a result of a detailed description of the following embodiments when taken in conjunction with the drawings.

Figure 1:
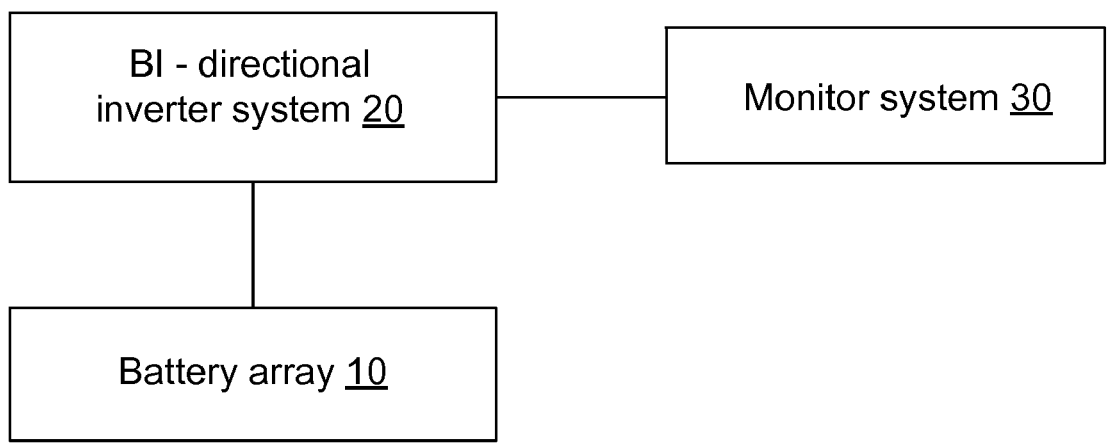
FIG. 1 is a structure sketch view of the battery-based grid energy storage according to some embodiments in the present invention.

As shown in FIG. 1, the battery-based grid energy storage for balancing the load of the power grid in the present invention comprises: a battery array 10; a bi-directional inverter system 20 configured to charge battery array using the electric power from the power grid, or conversely, input the power in the battery array to the power grid; a monitor system 30 configured to detect the load, frequency and phase of the power grid and control the bi-directional inverter system 20 to charge battery array 10 using the electric power form the power grid, or conversely, input the power from the battery array 10 to the power grid in accordance with the frequency and phase of the power grid so as to balance the load in the power grid.

In some embodiment, the battery array 10 further comprises a plurality of serially-connected batteries. The battery can be a Fe battery (i.e., the Lithium iron phosphate battery, via the Lithium ion phosphate battery as the cathode material, the rated voltage can be 3.2 V), or other types of battery. The bidirectional inverter system 20 is used to convert the alternating current from the power grid into direct current, and further charge the battery array 10 using the direct current. The bidirectional inverter system 20 is further used to convert the direct current from the battery array 10 into alternating current which has the same frequency and phase as the power grid, and input the converted alternating current into the power grid. The bidirectional inverter system 20 can be of any structure capable of charging and discharging.

Figure 2:
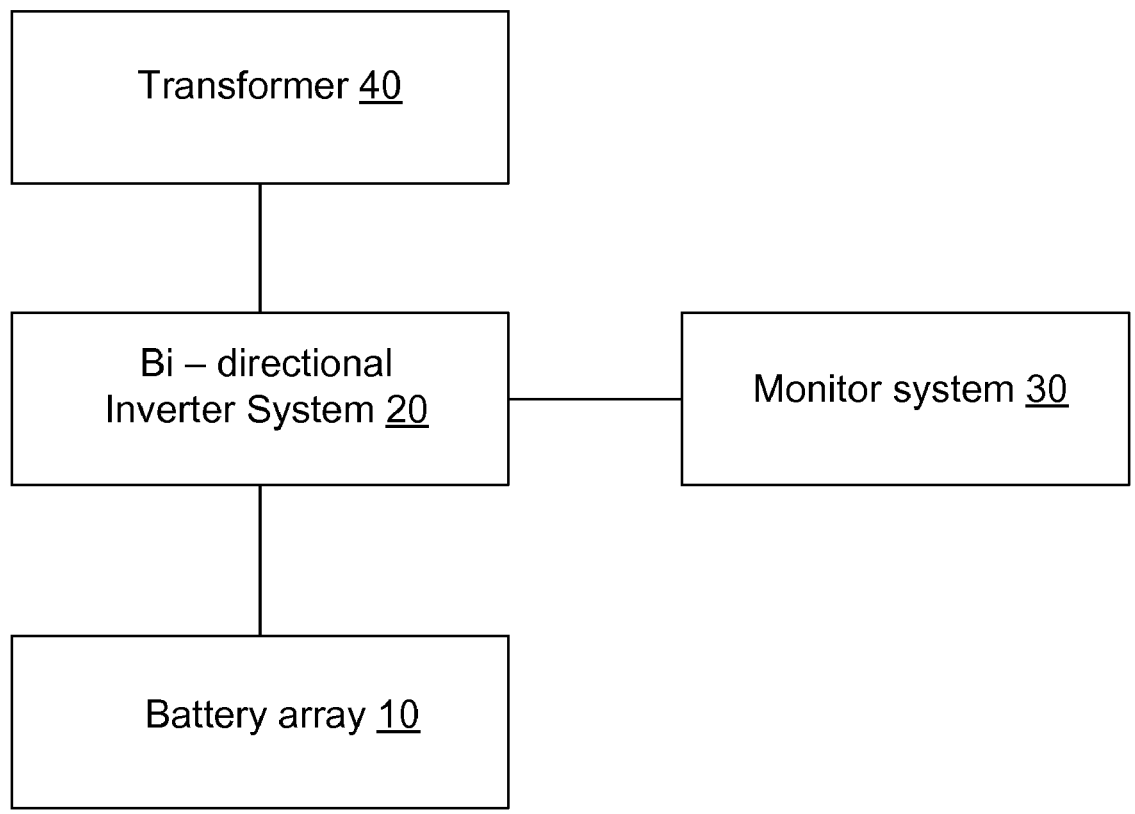
FIG. 2 is a structure sketch view of the battery-based grid energy storage according to one embodiment in the present invention.

In general, the electric power of the power grid is high-voltage, for example, the voltage is equal to or higher than 10 KV. The voltage that the battery array 10 can bear is far below 10 KV, for example, 0.4 KV. Therefore, in some embodiment, as shown in FIG. 2, the energy storage further comprises a transformer 40, wherein the transformer 40 is used to convert the high voltage current from the power grid into low voltage current, and further supply the low voltage current to the bidirectional inverter system 20 so that the bidirectional inverter system 20 charges the battery array using the low voltage current; or conversely, convert the low voltage current from the bi-directional inverter system 20 into high voltage current as the one in the power grid, and input the high voltage current into the power grid.

The battery-based grid energy storage has the following four modes:

Averaging Mode:

When the current moment is in the discharging time period, the monitor system 30 controls the bidirectional inverter system 20 to discharge the battery array 10.

When the current moment is in the charging time period, the monitor system 30 controls the bi-directional inverter system 20 to charge the battery array 10.

When the battery array 10 completes discharging and the current moment is still in the discharging time period, or when the battery array completes charging and the current moment is still in the charging time period, the monitor system 30 causes the bi-directional inverter system 20 to switch to a stand-by mode before entering the next time period.

Peak Value Cutting Mode:

The monitor system 30 detects the load in the power grid. When the current moment is in the discharging time period and the load of the power grid is higher than a predefined discharging threshold, the monitor system 30 controls the bi-directional inverter system 20 to discharge the battery array 10.

When the current moment is in the charging time period and the load of the power grid is lower than a predefined charging threshold, the monitor system 30 controls the bi-directional inverter system 20 to charge the battery array 10.

When the battery array 10 completes discharging and the current moment is still in the discharging time period, or while the battery array 10 completes charging and the current moment is still in the charging time period, the monitor system 30 controls the bi-directional inverter system 20 to switch to the stand-by mode before entering the next time period.

Wherein, the predefined discharging threshold is higher than 80% of the power grid capacity, and the predefined charging threshold is lower than 60% of the power grid capacity.

In general, the unit price of the electric power varies according to the usage status, for example, the unit price is relatively high during the period from 6 pm to 9 pm, while the unit price goes down after midnight. To optimize the profit, in some embodiment, the above-mentioned averaging mode and the peak value cutting mode are determined according to the different unit prices of the electric power at different time periods. For example, the time period of higher electricity unit price is set to be the discharging time period, and the time period of lower electricity unit price is set to be the charging time period. This embodiment can achieve low-price buy-in and high-price sale-out, thus optimizing the profit.

The charging and discharging time periods can be further determined, for example, according to the load of the power grid in different time periods of a day, wherein the time period with higher workload can be set as the discharging time period, and the time period with lower workload can be set as the charging time period.

The difference between the peak value cutting mode and the averaging mode is that, besides the charging/discharging time periods, the peak value cutting mode also considers whether the load of the power grid is peak or vale so that the peak value cutting mode can adjust the workload accordingly.

Compulsory Charging Mode:

When the battery-based grid energy storage is in this mode, the monitor system 30 controls the bi-directional inverter system 20 to charge the battery array 10 until the charging is completed or the mode is switched. When the current moment is not in the charging time period but the battery array 10 needs to be charged in case of emergency, for example, when debugging, the user may switch the mode of the battery-based grid energy storage to the compulsory charging mode and charge the battery array 10.

Compulsory Discharging Mode:

When the battery-based grid energy storage is in this mode, the monitor system 30 controls the bidirectional inverter system 20 to discharge the battery array 10 until the discharging is completed or the mode is switched. When the current moment is not in the discharging time period but the workload of the power grid becomes heavy in case of emergency, the user may switch the mode of the battery-based grid energy storage to the compulsory discharging mode to discharge the battery array 10 and reduce the workload of the power grid.

The above mentioned compulsory charging mode and the compulsory discharging mode actually supplement the averaging mode and the peak value cutting mode, such that the grid energy storage may be suitable for applications in various emergencies and working environments.

What needs to be explained is that the completion of charging or discharging of the battery array 10 in the above mentioned four modes is reached when the electric power in the battery array 10 is saturated or when the electricity in the battery array 10 is exhausted. A user may switch the mode of the battery-based grid energy storage according to the actual requirements.

Figure 3:
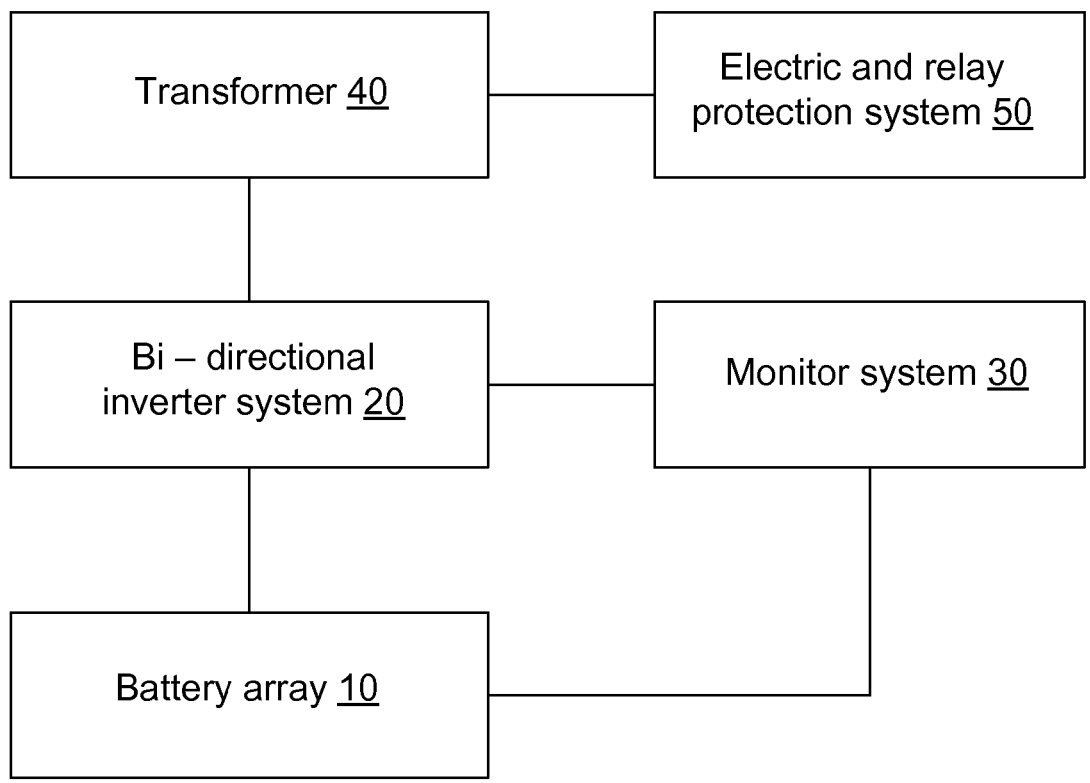
FIG. 3 is the structure sketch view of the battery-based grid energy storage according to another embodiment in the present invention.

In some embodiment, as shown in FIG. 3, the battery-based grid energy storage further comprises an electric and relay protection system 50, wherein the electric and relay protection system 50 is used to protect the transformer 40. The electric and relay protection system 50 comprises a high voltage side incoming cabinet protection device, a high voltage side feeder cabinet protection device, a low voltage side incoming cabinet protection device and a low voltage side feeder cabinet protection device, wherein, the high voltage side incoming cabinet protection device and the high voltage feeder cabinet protection device are set in the high voltage side incoming cabinet and the high voltage side feeder cabinet of the transformer 40 respectively; the low voltage side incoming cabinet protection device and the low voltage side feeder cabinet protection device are in the low voltage side incoming cabinet and the low voltage side feeder cabinet of the transformer 40, respectively. The high voltage side incoming cabinet protection device may include switch components, lightning arrester and electric display devices and it is capable to insulate the high voltage power supply and ensure safe examination and repair. In some embodiment, the high voltage side feeder cabinet protection device further includes a CSP-2000 microcomputer system for at least the purposes of over-current protection, instantaneous trip current protection, high temperature alarm, over-temperature tripping, and zero sequence current protection. The low voltage side incoming cabinet protection device and the low voltage side feeder cabinet protection device are configured to perform delay in case of overloading or instantaneous protection over short circuit.

In some embodiment, the monitor system further detects the electric energy storage level in the battery array 10 and controls the bi-directional inverter system 20 according to the detected result to keep the battery array 10 working at a predetermined electric energy storage range. In this case, overcharging or over discharging of the battery array 10 may be avoided. The predetermined electric energy storage range can be set according to the default protection property of the battery array, for example, it can be set to be from 10% to 90% of the maximum electric power stored in the battery array 10.

The monitor system 30 further detects the temperature of the battery array 10 and controls the bidirectional inverter system 20 according to the detected temperature of the battery array 10 to keep the battery array 10 working at a predetermined temperature range. In this case, damages to the battery array 10 caused by over-heating can be avoided and protection of the battery array 10 can be achieved. The predetermined temperature range can be set according to the default protection property of the battery array such that it is lower than the maximum temperature that the battery array 10 can sustain. For example, it can be set to be equal to or less than 50 Celsius degree.

The battery-based grid energy storage may further comprise a battery management system, wherein the electric energy storage level and the temperature of the battery array 10 can be obtained using the battery management system.

In some embodiment, the monitor system 30 may further regulate the charging power of the battery array 10 according to the load of the power grid to avoid overload at the power grid. For example, if the capacity of the power grid is 10000 KW, and the load of the power grid is 9990 KW, the charging power of the battery array 10 is regulated not to exceed 10 KW. In this case, the power supply to other electricity consumers will not be affected by charging the battery-based grid energy storage.

The monitor system 30 may further regulate the discharging power of the battery array 10 according to the load of the power grid to ensure that the power of the power grid not exceed the capacity of the grid after receiving the electric power from the battery array 10. In this case, adverse impact on the power grid can be avoided.

Furthermore, the monitor system 30 may automatically detect the status of the power grid to avoid the island effect. The monitor system 30 may further detect and diagnose the faults automatically at the beginning and during the operation, and start auto-protection based on the type and the scope of the impact of the detected faults. The automatic fault detection and diagnosis are technologies widely known in the art and will not be described in detail herein.

The battery-based grid energy storage in the present invention can effectively balance the load of the power grid and meet the electricity consuming needs during peak times.

What is claimed is:

1. A battery-based grid energy storage for balancing the load of a power grid comprises:
   a battery array;
   a bi-directional inverter system configured to charge the battery array using power from the power grid, or conversely, to transmit power from the battery array to the power grid;
   a monitor system configured to detect the load, frequency and phase of the power grid, and control the bi-directional inverter system to charge the battery array using power from the power grid, or conversely, transmit power from the battery array to the power grid in accordance with the frequency and phase of the power grid; and
   a transformer configured to transform high voltage electric power of the power grid into low voltage electric power, wherein the low voltage electric power is supplied to the bi-directional inverter system to charge the battery array and transform low voltage electric power of the bi-directional inverter system into high voltage electric power, wherein the high voltage electric power is transmitted to the power grid,
   wherein:
      during a predefined battery discharging time period, the monitor system is configured to control the bi-directional inverter system to transmit power from the battery array to the power grid if the currently-detected load of the power grid is above a first predefined threshold of the power grid capacity, and
      during a predefined battery charging time period, the monitor system is configured to control the bi-directional inverter system to transmit power from the power grid to the battery array if the currently-detected load of the power grid is below a second predefined threshold of the power grid capacity.

2. The battery-based grid energy storage in claim 1, wherein the monitor system is further configured to:
   control the bi-directional inverter system to stop transmitting power from the battery array to the power grid after a power level of the batter array is below a first predefined threshold before the end of the predefined battery discharging time period and
   control the bi-directional inverter system to stop transmitting power from the power grid to the battery array after the power level of the batter array is above a second predefined threshold before the end of the predefined battery charging time period.

3. The battery-based grid energy storage in claim 1, wherein the first predefined threshold of the power grid capacity is 80% of the power grid capacity, and the second predefined threshold of the power grid capacity is 60% of the power grid capacity.

4. The battery-based grid energy storage in claim 1, wherein, during the predefined battery discharging time period, the monitor system is configured to control the bi-directional inverter system to transmit power from the power grid to the battery array in response to a user instruction provided to the monitor system.

5. The battery-based grid energy storage in claim 1, wherein, during the predefined battery charging time period, the monitor system is configured to control the bi-directional inverter system to transmit power from the battery array to the power grid in response to a user instruction provided to the monitor system.

6. The battery-based grid energy storage in claim 1, further comprises an electric and relay protection system, wherein the electric and relay protection system is used to protect the transformer.

7. The battery-based grid energy storage in claim 1, wherein the monitor system is further configured to detect an electric energy storage level of the battery array, and control the bi-directional inverter system based on the detected electric energy storage level so as to keep the battery array within a predetermined electric energy storage range.

8. The battery-based grid energy storage in claim 1, wherein the monitor system is further configured to detect a temperature of the battery array, and control the bi-directional inverter system based on the detected temperature so as to keep the battery array within a predetermined temperature range.

9. The battery-based grid energy storage in claim 1, wherein, during the predefined battery charging time period, the monitor system is further configured to detect a load of the power grid, and reduce the power charged into the battery array based on the detected load of the power grid to protect the power grid from overload.

10. The battery-based grid energy storage in claim 1, wherein, during the predefined battery discharging time period, the monitor system is further configured to detect a load of the power grid, and reduce the power discharged from the battery array based on the detected load of the power grid such that the power grid does not exceed its capacity after receiving the electric power from the battery array.

* * * * *

UNITED STATES PATENT AND TRADEMARK OFFICE
CERTIFICATE OF CORRECTION

PATENT NO. : 8,362,643 B2
APPLICATION NO. : 12/540312
DATED : January 29, 2013
INVENTOR(S) : Hongbin Luo et al.

Page 1 of 1

It is certified that error appears in the above-identified patent and that said Letters Patent is hereby corrected as shown below:

On the title page, at Item (57), line 2, please delete "an" and insert -- a --;

On the title page, at Item (57), line 10, please delete "form" and insert -- from --;

At column 6, line 15, please delete "batter" and insert -- battery --;

At column 6, line 20, please delete "batter" and insert -- battery --.

Signed and Sealed this
Twelfth Day of March, 2013

Teresa Stanek Rea
*Acting Director of the United States Patent and Trademark Office*